United States Patent
Sugahara

(10) Patent No.: US 12,502,912 B2
(45) Date of Patent: Dec. 23, 2025

(54) TIRE

(71) Applicant: SUMITOMO RUBBER INDUSTRIES, LTD., Kobe (JP)

(72) Inventor: Kazuchika Sugahara, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 131 days.

(21) Appl. No.: 18/211,781

(22) Filed: Jun. 20, 2023

(65) Prior Publication Data

US 2023/0415515 A1 Dec. 28, 2023

(30) Foreign Application Priority Data

Jun. 24, 2022 (JP) .................... 2022-101546

(51) Int. Cl.
| | | |
|---|---|---|
| *B60C 1/00* | (2006.01) | |
| *B60C 11/00* | (2006.01) | |
| *B60C 11/03* | (2006.01) | |
| *C08K 3/04* | (2006.01) | |
| *C08K 3/36* | (2006.01) | |
| *C08L 9/06* | (2006.01) | |

(52) U.S. Cl.
CPC ........ *B60C 1/0016* (2013.01); *B60C 11/0008* (2013.01); *B60C 11/03* (2013.01); *C08K 3/04* (2013.01); *C08K 3/36* (2013.01); *C08L 9/06* (2013.01); *B60C 2011/0025* (2013.01); *B60C 2011/0341* (2013.01); *C08K 2201/006* (2013.01)

(58) Field of Classification Search
CPC ..... B60C 2011/0033; B60C 2011/0025; B60C 2011/0341; B60C 2011/0016; B60C 11/0008; B60C 11/005; B60C 1/0016
See application file for complete search history.

(56) References Cited

U.S. PATENT DOCUMENTS

| | | | | |
|---|---|---|---|---|
| 2014/0100316 A1* | 4/2014 | Washizu | ................. | C08F 12/08 |
| | | | | 526/337 |
| 2020/0369087 A1* | 11/2020 | Matsui | ................ | B60C 11/0008 |
| 2022/0235209 A1* | 7/2022 | Washizu | ................. | C08L 71/02 |
| 2023/0202235 A1* | 6/2023 | Ono | ....................... | B60C 1/0016 |

FOREIGN PATENT DOCUMENTS

| | | |
|---|---|---|
| JP | 10-129214 A | 5/1998 |
| JP | 2005-119814 A | 5/2005 |
| JP | 2012-218652 A | 11/2012 |
| JP | 2021107502 A * | 7/2021 |

OTHER PUBLICATIONS

Japanese Office Action for corresponding Japanese Application No. 2022-101546, dated Mar. 4, 2024, with partial English translation.

* cited by examiner

*Primary Examiner* — Cedrick S Williams
(74) *Attorney, Agent, or Firm* — Birch, Stewart, Kolasch & Birch, LLP

(57) ABSTRACT

Provided is a tire with a tread portion having a circumferential groove communicating in the circumferential direction, wherein the cap rubber layer forming the tread portion is formed from a rubber composition which contains 40 parts by mass or more and 80 parts by mass or less of styrene-butadiene rubber (SBR) having a styrene content of 25% by mass or less, and 60 parts by mass or more of a filler with respect to 100 parts by mass of the rubber component, and has a loss tangent 10° C. tan δ of less than 0.28, and a glass transition temperature Tg (° C.) of −40° C. or lower; and the glass transition temperature Tg (° C.) and the depth G (mm) of the circumferential groove satisfy Tg≤−0.5×G−35; and an object of the present invention is to improve off-road performance of a tire.

13 Claims, No Drawings

TIRE

TECHNICAL FIELD

The present invention relates to a tire.

BACKGROUND ART

Tires that run on off-road surfaces are required to have the ability to scrape off sand and soil on the off-road surface (soil discharge performance), the ability to suppress the occurrence of chipping during off-road running (chipping resistance performance), and propulsion performance on an off-road surface (off-road performance). Conventionally, it has been proposed to improve off-road performance by devising the rubber composition that constitutes the tread portion of the tire and the surface shape of the tread portion. (for example, Patent documents 1 to 3).

PRIOR ART DOCUMENTS

Patent Document

[Patent document 1] JP10-129214 A
[Patent document 2] JP2005-119614 A
[Patent document 3] JP2012-218652 A

SUMMARY OF INVENTION

Problem to be Solved by the Invention

However, the off-road performance of tires manufactured based on the above-described conventional technology is still insufficient, and further improvement is desired.

Accordingly, an object of the present invention is to improve the off-road performance of a tire.

Means for Solving the Problem

The present invention is a tire with a tread portion having a circumferential groove communicating in the circumferential direction, wherein the cap rubber layer forming the tread portion is formed from a rubber composition which contains
- 40 parts by mass or more and 80 parts by mass or less of styrene-butadiene rubber (SBR) having a styrene content of 25% by mass or less in 100 parts by mass of the rubber component, and 60 parts by mass or more of a filler with respect to 100 parts by mass of the rubber component, and has a loss tangent 10° C. tan δ measured under the conditions of temperature of 10° C., frequency of 10 Hz, initial strain of 5%, and dynamic strain rate of 1% and in deformation mode; tensile of less than 0.28, and
- a glass transition temperature Tg (° C.) of −40° C. or lower; and
- the glass transition temperature Tg (° C.) and the depth G (mm) of the circumferential groove satisfy the following (formula 1).

$$Tg \leq -0.5 \times G - 35 \qquad \text{(formula 1)}$$

Effect of the Invention

According to this invention, the off-road performance of a tire can be improved.

EMBODIMENTS FOR CARRYING OUT THE INVENTION

[1] Features of the Tire According to the Present Invention

First, the features of the tire according to the present invention will be explained.

1. Overview

The tire according to the present invention is a tire with a tread portion having circumferential grooves (hereinafter also simply referred to as "grooves") communicating in the circumferential direction, wherein the cap rubber layer forming the tread portion is formed from a rubber composition which contains 40 parts by mass or more and 80 parts by mass or less of SBR having a styrene content of 25% by mass or less in 100 parts by mass of the rubber component, and 60 parts by mass or more of a filler with respect to 100 parts by mass of the rubber component. The loss tangent 10° C. tan δ of the rubber composition measured in deformation mode: tensile under the conditions of temperature 10° C., frequency 10 Hz, initial strain 5%, and dynamic strain rate 1% is 0.28 or more. At the same time, the glass transition temperature Tg (° C.) of the rubber composition is −40° C. or lower. Further, in the tire according to the present invention, the glass transition temperature Tg (° C.) and the depth G (mm) of the circumferential groove satisfy the following (formula 1).

$$Tg \leq -0.5 \times G - 35 \qquad \text{(formula 1)}$$

The tread portion is a member in the area forming the contact surface of the tire, and refers to a portion radially outside of members containing fiber materials such as carcass, belt layer, and belt reinforcing layer. The cap rubber layer refers to a rubber layer provided radially outward of the tire, but is not limited to the rubber layer forming the outermost layer of the tread portion. If there are two or more layers within 5 mm from the tread surface toward the inside, at least any one layer may satisfy the requirements of the rubber composition.

By having these characteristics, it is possible to improve the off-road performance as described later.

2. Mechanism of Effect Manifestation in Tire According to the Present Invention The mechanism of effect manifestation in the tire according to the present invention is considered as follows.

As described above, when a tire runs on an off-road surface, it is necessary to scrape out the sand and soil on the off-road surface and run. After sand and soil on the road surface are compressed and taken into the tread grooves, it is considered that the propulsive force is obtained by discharging them by the rotation of the tire.

The cap rubber layer of the tire according to the present invention is formed from a rubber composition which contains SBR having a styrene content of 25% by mass or less in 40 parts by mass or more and 80 parts by mass or less in 100 parts by mass of the rubber component, and contains 60 parts by mass or more of a filler with respect to 100 parts by mass of the rubber component.

By containing 40 parts by mass or more and 80 parts by mass or less of SBR having a styrene content of 25% by mass or less in 100 parts by mass of the rubber component, a network of a small amount of styrene domains can be properly formed in the rubber matrix.

The formation of this styrene domain network alleviates strain due to rubber deformation and enables smooth transmission of force in the tread portion, so the tread portion is easily deformed and restored, and the sand and soil taken into the groove can be efficiently compressed between blocks on the tread surface.

The styrene content mentioned above is more preferably 21.3% by mass or less, further preferably 20% by mass or less, and further preferably 15% by mass or less. On the other hand, as the lower limit, it is preferably 3% by mass or more, more preferably 5% by mass or more, and further preferably 8% by mass or more.

In the present invention, the phrase "contains 40 parts by mass or more and 80 parts by mass or less of SBR having a styrene content of 25% by mass or less in 100 parts by mass of the rubber component" indicates that the amount of SBR in 100 parts by mass of the rubber component is 40 parts by mass or more and 80 parts by mass or less, and the styrene content in the entire SBR is 25% by mass or less.

That is, when a styrene-containing polymer (SBR) is contained alone in the rubber component, it indicates that the styrene content is 25% by mass or less, and when multiple styrene-containing polymers (SBR) are contained in the rubber component, it shows that the styrene content obtained from the sum of the products of the styrene content (% by mass) in each polymer and the compounding amount (parts by mass) of the polymer with respect to 100 parts by mass of the rubber component is 25% by mass or less.

More specifically, when 100 parts by mass of the rubber component contains SBR1 (X1 parts by mass) with a styrene content of S1% by mass and SBR2 (X2 parts by mass) with a styrene content of S2% by mass, it is indicated that the styrene content calculated from the formula $\{(S1 \times X1)+(S2 \times X2)\}/(X1+X2)$ is 25% by mass or less.

In addition, in the vulcanized rubber composition, it is also possible to calculate the styrene content by determining the amount of styrene contained in the rubber component after acetone extraction using solid-state nuclear magnetic resonance (solid-state NMR) or Fourier transform infrared spectrophotometer (FTIR).

In the tire according to the present invention, a large amount of 60 parts by mass or more of the filler is contained with respect to 100 parts by mass of the rubber component. As a result, within the cap layer, in addition to the network of styrene domains described above, a network of fillers can also be formed, which further facilitates the transmission of force. As a result, the cap layer is sufficiently deformed and restored, and the sand and soil that have been taken into the grooves can be efficiently compressed and discharged from the grooves. It is more preferably 90 parts by mass or more, further preferably 100 parts by mass or more, further preferably 105 parts by mass or more, further preferably 115 parts by mass or more, further preferably 120 parts by mass or more, and further preferably 130 parts by mass or more. On the other hand, although the upper limit is not particularly limited, it is preferably 180 parts by mass or less, more preferably 160 parts by mass or less, and further preferably 140 parts by mass or less in consideration of kneading processability.

In the tire according to the present invention, the loss tangent 10° C. tan δ of the rubber composition forming the cap rubber layer measured under the conditions of temperature of 10° C., frequency of 10 Hz, and initial strain of 5%, and dynamic strain rate of 1%, deformation mode tensile is increased to 0.28 or more.

The loss tangent tan δ is a viscoelastic parameter that indicates the energy absorption performance, and the larger the value, the more the heat generation due to the deformation of the rubber can be accelerated. In the present invention, the 10° C. tan δ is increased to 0.28 or more, as described above, so that the energy applied to the tread portion can be easily released as heat, and, as a result, it is difficult to cause chipping of rubber, and the occurrence of chipping can be sufficiently suppressed. In addition, since rubber is easily restored to its deformation, sand and soil taken into the grooves can be efficiently compressed. It is more preferably 0.29 or more, further preferably 0.30 or more, further preferably 0.31 or more, further preferably 0.32 or more, further preferably 0.33 or more, further preferably 0.35 or more, and further preferably 0.36 or more. Although the upper limit is not particularly limited, it is preferably 0.45 or less, more preferably 0.43 or less, and further preferably 0.40 or less.

In the above description, only 10° C. tan δ is specified, but when tan δ is large over a wide temperature range, more energy escapes as heat, and chipping can be further suppressed, which is preferable. Specifically, the loss tangent at 0° C. (0° C. tan δ) is preferably 0.29 or more, more preferably 0.30 or more, further preferably 0.33 or more, further preferably 0.35 or more, further preferably 0.36 or more, further preferably 0.37 or more, further preferably 0.38 or more, further preferably 0.39 or more, further preferably 0.40 or more, and further preferably 0.41 or more. Although the upper limit is not particularly limited, it is preferably 0.50 or less, and more preferably 0.48 or less. The loss tangent at 30° C. (30° C. tan δ) is preferably 0.20 or more, more preferably 0.24 or more, further preferably 0.25 or more, further preferably 0.27 or more, further preferably 0.28 or more, and further preferably 0.29 or more. Although the upper limit is not particularly limited, it is preferably 0.34 or less, more preferably 0.33 or less, further preferably 0.31 or less, and further preferably 0.30 or less.

In the above, the loss tangent (tan δ) can be measured using a viscoelasticity measuring device such as "Eplexor (registered trademark)" manufactured by GABO.

On the other hand, when viewed from the grooves provided in the circumferential direction of the tread portion (circumferential grooves), the deeper the grooves, the larger the groove volume, and the more sand and soil taken in, but the force required to compress the sand and soil becomes easier to disperse, making it difficult to obtain propulsive force efficiently.

Therefore, in the present invention, the glass transition temperature Tg (° C.) of the rubber composition is −40° C. or lower, and the glass transition temperature Tg (° C.) is a sufficiently low value with respect to the groove depth. Specifically, the glass transition temperature Tg (° C.) and the depth G (mm) of the circumferential groove are set to satisfy the relationship Tg≤−0.5×G−35. Although, (−0.5× G−35) is not particularly limited, as long as it is Tg or more, the lower limit of the difference {(−0.5×G−35)−Tg} is, for example, 0 or more, and the upper limit is, for example, 10 or less.

As a result, even in deep grooves, the tread portion can be flexibly deformed and restored, the dispersion of the force for compressing sand and soil is suppressed, more sand and soil can be taken in and compressed, and propulsion can be obtained efficiently. It is more preferable that Tg≤−0.5×G− 40. Here, although (−0.5×G−40) is not particularly limited as long as it is Tg or more, the lower limit of the difference {(−0.5×G−40)−Tg} is, for example, 0 or more, and the upper limit is, for example, 5 or less.

The glass transition temperature (Tg) of the rubber composition described above can be obtained from the temperature distribution curve of tan δ measured using a viscoelasticity measuring device such as Eplexor series manufactured by GABO, under the conditions of frequency of 10 Hz, initial strain of 10%, amplitude of ±0.5%, and heating rate of 2° C./min. In the case of the present invention, the temperature corresponding to the largest tan δ value within the range of −60° C. or higher and 40° C. or lower in the measured temperature distribution curve is defined as the glass transition temperature (Tg). If there are two or more points with the largest tan δ value within the range of −60° C. or higher and 40° C. or lower, the point with the lowest temperature is taken as Tg. For example, in the present invention, if the largest value of tan δ is in the range of −60° C. or more and 40° C. or less, the temperature showing the largest value is Tg according to the above definition. In addition, if a temperature distribution curve is obtained in which the temperature showing the maximum value of tan δ is −60° C., for example, in a case wherein tan δ gradually decreases as the temperature rises in the range of −60° C. or more and 40° C. or less, the glass transition temperature (Tg) is −60° C. according to the above definition.

In the present invention, the specific glass transition temperature (Tg) of the rubber composition is preferably −40° C. or less, more preferably −41° C. or less, further preferably −42° C. or less, further preferably −43° C. or lower, further preferably −44° C. or lower, further preferably −47° C. or lower, further preferably −48° C. or lower, and further preferably −49° C. or lower.

In the present invention, the term "circumferential groove" refers to a groove having a groove width of 3 mm or more and communicating in the tire circumferential direction, which is closest to the tire equatorial plane, and extends continuously in the circumferential direction. A non-linear groove such as a zigzag groove and a wavy groove is also included in circumferential grooves if the groove extends continuously in the circumferential direction.

The "groove depth" refers to the height from the groove bottom to the opening in the radial direction of the tire under standardized state and no load. The standardized state refers to that the rim is installed in a normal rim and the standardized internal pressure is applied. In the case of non-linear grooves or stepped grooves, the maximum depth from the opening is defined as "groove depth".

In the present invention, the specific depth G (mm) of the circumferential groove is preferably 10 mm or more, and more preferably 12 mm or more. On the other hand, as the upper limit, it is preferably less than 17 mm, and more preferably 14 mm or less.

In addition, the "standardized rim" described above is a rim defined for each tire in the standard system including the standard on which the tire is based. For example, in the case of JATMA (Japan Automobile Tire Association), it is the standard rim in applicable sizes described in the "JATMA YEAR BOOK", in the case of "ETRTO (The European Tire and Rim Technical Organization)", it is "Measuring Rim" described in "STANDARDS MANUAL", and in the case of TRA (The Tire and Rim Association, Inc.), it is "Design Rim" described in "YEAR BOOK.". JATMA, ETRTO, and TRA are referred to in that order, and if there is an applicable size at the time of reference, that standard is followed. In the case of tires that are not specified in the standard, it refers a rim that can be assembled and can maintain internal pressure, that is, the rim that does not cause air leakage from between the rim and the tire, and has the smallest rim diameter, and then the narrowest rim width.

The "standardized internal pressure" is the air pressure specified for each tire by the above-mentioned standards, and is the maximum air pressure for JATMA, "INFLATION PRESSURE" for ETRTO, and the maximum value described in the table "TIRE LOAD LIMITS AT VARIOUS COLD INFLATION PRESSURES" for TRA. As in the case of "standardized rim", refer to JATMA, ETRTO, and TRA in that order, and their standards are followed. And, in the case of a tire that is not defined in the standard, it is the standardized internal pressure (however, 250 kPa or more) of another tire size (specified in the standard) for which the standardized rim is described as the standard rim. When a plurality of standardized internal pressures of 250 kPa or more are listed, the minimum value among them is referred.

[2] A More Preferred Embodiment of the Tire According to the Present Invention

The tire according to the present invention can obtain even greater effects by adopting the following embodiments.

1. Filler

As described above, in the tire according to the present invention, the filler is contained in the cap rubber layer in a large amount of 60 parts by mass or more with respect to 100 parts by mass of the rubber component, so that a filler network is formed in the cap rubber layer to further facilitate the transmission of force within the cap layer.

In the present invention, it is preferable to use carbon black and silica as specific fillers. At this time, the content of carbon black may be greater than the content of silica, that is, (silica content/carbon black content) may be less than 1.

As a result, the reinforcing property of the carbon black is exhibited, and the chipping resistance can be improved. It is more preferably 0.8 or less, and further preferably 0.6 or less.

2. Tread Thickness and Multi-Layered Tread

In the present invention, the tread portion may be formed of only one layer of the cap rubber layer provided on the radially outer side of the tire, or may be formed of two layers by providing a base rubber layer inner side the cap rubber layer in the radial direction of the tire. In addition, it may have three layers, four layers or more. In this case, considering that sand and soil are sufficiently taken into the grooves, the thickness of the cap rubber layer that occupies the entire tread portion is preferably 10% or more, and more preferably 70% or more.

In the present invention, the "thickness of the tread portion" refers to the thickness of the tread portion on the tire equatorial plane in the cross section in the tire radial direction. When the tread portion is formed of a single rubber composition, it refers to the thickness of the rubber composition, and in the case of a laminated structure of multiple rubber compositions, which will be described later, it refers to the total thickness of these layers.

When the tire has a groove on the equatorial plane, it refers to the thickness from the intersection of a straight line connecting the radially outermost end points of the groove with the tire equatorial plane to the radially innermost interface of the tread portion.

The tread portion is a member in the area forming the contact surface of the tire, and refers to a portion radially outside of members containing fiber materials such as carcass, belt layer, and belt reinforcing layer. The thickness of the tread portion can be measured by aligning the bead portion with the standardized rim width in a cross section obtained by cutting the tire in the radial direction.

The term "thickness of the cap rubber layer" refers to the thickness of the cap rubber layer on the tire equatorial plane in the tire radial cross-section. When the tire has a groove on the equatorial plane, it refers to the thickness from the intersection of the straight line connecting the end points of the tire with the tire equatorial plane to the interface with the innermost base rubber layer in the tire radial direction of the tread portion. The "thickness of the base rubber layer" refers to the thickness from the interface with the cap rubber layer to the innermost interface in the tire radial direction of the tread portion.

As described above, the thickness of the cap rubber layer and the thickness of the base rubber layer can be calculated by determining the thickness of the cap rubber layer and the thickness of the base rubber layer in the thickness of the tread portion. When a groove exists on the tire equatorial plane, it can be obtained by calculating the thickness of the cap rubber layer and the thickness of the base rubber layer at the center of the land portion of the tread portion closest to the equatorial plane.

When the tread portion is composed of a cap rubber layer and a base rubber layer, considering the steering stability, it is preferable that tan δ of the base rubber layer at each temperature (0° C., 10° C., 30° C.) is smaller than each tan δ of the cap rubber layer.

The above-mentioned tan δ at each temperature of the cap rubber layer and the base rubber layer can be appropriately adjusted depending on the amount and type of compounding materials described later. For example, it can be increased by increasing the amount of styrene in the rubber component, increasing the amount of SBR in the rubber component, increasing the amount of styrene in the SBR component, increasing the content of fillers such as silica and carbon black, and increasing the content of the resin component, and the like. Conversely, it can be lowered by reducing the amount of styrene in the rubber component, reducing the amount of SBR in the rubber component, reducing the amount of styrene in the SBR component, reducing the content of fillers such as silica and carbon black, reducing the content of the resin component, and the like.

3. Acetone Extractable Content (AE) of Cap Rubber Layer

In the present invention, the acetone extractable content (AE) of the cap rubber layer is preferably 10% by mass or more, more preferably 12% by mass or more, and further preferably 14% by mass or more. On the other hand, although the upper limit is not particularly limited, it is preferably 25% by mass or less, more preferably 20% by mass or less, and further preferably 17% by mass or less.

The acetone extractable content (AE) can be considered as an index indicating the amount of softening agent and the like in the rubber composition, and can also be considered as an index indicating the softness of the rubber composition. Therefore, by controlling the amount of AE in the cap rubber layer as described above, the cap rubber layer is appropriately deformed, making it easier to obtain the force for compressing sand and soil.

Note that the acetone extractable content (AE) can be measured in accordance with JIS K 6229:2015. Specifically, a vulcanized rubber test piece cut out from the measurement site is immersed in acetone at room temperature and normal pressure for 72 hours, and the mass reduction rate (%) of the test piece is determined to obtain AE (% by mass).

More specifically, each vulcanized rubber test piece is immersed in acetone at room temperature and normal pressure for 72 hours to extract soluble components; the mass of each test piece before and after extraction is measured; and the acetone-extractable content can be calculated by the following formula.

Acetone extractable content (%)={(mass of rubber test piece before extraction−mass of rubber test piece after extraction)/(mass of rubber test piece before extraction)}×100

Moreover, the above-mentioned acetone extractable content can be appropriately changed by changing the compounding ratio of the plasticizer in the rubber composition.

4. Land Ratio

In the tire according to the present invention, the land ratio in the tread portion of the tire installed on a standardized rim and having a standardized internal pressure is preferably 40% or more.

"Land ratio" is the ratio of the actual contact area to the virtual contact area filled with all the grooves on the surface of the tread portion. By setting the land ratio to 40% or more, sufficient grip performance can be stably obtained, since area in contact with the road becomes large. On the other hand, it is preferable to set the land ratio to 95% or less. As a result, sand and soil can be sufficiently taken into the grooves of the tread.

In addition, the product of the content (parts by mass) of styrene-butadiene rubber (SBR) having a styrene content of 25% by mass or less in 100 parts by mass of the rubber component and the land ratio (%) in the tread portion (SBR content×land ratio) is preferably 7500 or less, more preferably 7200 or less, further preferably 6500 or less, further preferably 6000 or less, further preferably 5400 or less, further preferably 5000 or less, further preferably 4480 or less, further preferably 4400 or less, and further preferably 4160 or less. Although the lower limit is not particularly limited, it is preferably 2080 or more, more preferably 2800 or more, further preferably 3000 or more, further preferably 3120 or more, further preferably 3500 or more, further preferably 3640 or more, and further preferably 4000 or more. As a result, off-road performance can be further improved by cooperating with the effect of the styrene domain network.

The above land ratio can be obtained from the ground contact shape under standardized rim, standardized internal pressure, and standardized load conditions.

Specifically, the tire is installed on a standardized rim, a standardized internal pressure is applied, and the tire is allowed to stand at 25° C. for 24 hours). Thereafter, an ink is printed on the tire tread surface, a standardized load is applied and then the tire tread surface is pressed against a thick paper (camber angle is 0°) to transfer the ink to the paper. Thus, the contact shape can be obtained. The transfer is made at five locations by rotating the tire by 72° in the circumferential direction. That is, the ground contact shape is obtained five times. At this time, for each of the five ground contact shapes, the discontinuous portions with the outline grooves are smoothly connected, and the resulting shape is defined as a virtual contact surface.

Then, the land ratio can be obtained from (average area of the five ground contact shapes (black portions) transferred to the thick paper/average of the areas of virtual contact surfaces obtained from the five ground contact shapes)×100 (%).

The "standardized load" is the load defined for each tire by the standards in the standard system including the standard on which the tire is base and refers to the maximum mass that can be loaded on the tire, and is the maximum load capacity for JATMA, "LOAD CAPACITY" for ETRTO, and the maximum value described in "TIRE LOAD LIMITS AT VARIOUS COLD INFLATION PRESSURES" for TRA. As in the case of "standardized internal pressure", JATMA, ETRTO, and TRA are referred to in that order, and their standards are followed. Then, in the case of a tire not specified in the standard, the standardized load $W_L$ is obtained by the following calculation.

$$V=\{(Dt/2)^2-(Dt/2-Ht)^2\}\times\Pi\times W_t$$

$$W_L=0.000011\times V+175$$

$W_L$: standardized load (kg)
V: virtual volume of tire (mm³)
Dt: tire outer diameter Dt (mm)
Ht: tire section height (mm)
Wt: cross-sectional width of tire

5. Aspect Ratio

The aspect ratio indicates the ratio of the cross-sectional height to the tire cross-sectional width of the tire. The smaller this ratio, a large ground contact area is secured and the more sand and soil can be taken into the tread portion and discharged. As a result, it is possible to improve the off-road performance. In the present invention, the specific aspect ratio is preferably 80% or less.

In addition, the product of the filler content (parts by mass) with respect to 100 parts by mass of the rubber component and the aspect ratio (filler content×aspect ratio) is preferably 9120 or less, more preferably 9100 or less, further preferably 8700 or less, further preferably 8400 or less, further preferably 8050 or less, further preferably 8000 or less, further preferably 7350 or less, further preferably 7200 or less, further preferably 7000 or less, further preferably 6500 or less, further preferably 6300 or less, and further preferably 6000 or less. Although the lower limit is not particularly limited, it is preferably 1800 or more, more preferably 2500 or more, further preferably 3000 or more, further preferably 3500 or more, further preferably 4000 or more, and further preferably 4200 or more. As a result, off-road performance can be further improved by cooperating with the effect of the network of the filler.

Note that the above aspect ratio (%) can be obtained by the following formula using the cross-sectional height Ht (mm), the cross-sectional width Wt (mm), the tire outer diameter Dt (mm), and the rim diameter R (mm) when the internal pressure is 250 kPa.

Aspect ratio (%)=($Ht/Wt$)×100%

$Ht=(Dt-R)/2$

[3] Embodiment

The present invention will be specifically described below based on embodiments.

1. Rubber Composition Forming Cap Layer

In the tire according to the present invention, the rubber composition forming the cap rubber layer can be obtained by adjusting appropriately the type and amount of various compounding materials such as rubber components, fillers, softening agent, vulcanizing agents, and vulcanization accelerators described below.

(1) Compounding Material (a) Rubber Component

The rubber component is not particularly limited, and rubbers (polymers) commonly used in the manufacture of tires can be used. Examples of the rubbers include diene rubbers such as isoprene based rubber, butadiene rubber (BR), styrene butadiene rubber (SBR), and nitrile rubber (NBR); butyl based rubber such as butyl rubber; and thermoplastic elastomers such as styrene butadiene styrene block copolymer (SBS) and styrene-butadiene block copolymer (SB).

In the present embodiment, among these, from the point of containing styrene in the rubber component, any one of styrene-based polymers such as SBR, SBS, and SB is contained. Preferably SBR is contained. These styrene-based polymers may be used in combination with other rubber components. For example, combination of SBR and BR, and combination of SBR, BR and isoprene rubber are preferred.

(a-1) SBR

The weight average molecular weight of SBR is, for example, more than 100,000 and less than 2,000,000. Further, in the present invention, as described above, the content of styrene in the SBR component is set to 25% by mass or less. It is more preferably 20% by mass or less, and further preferably 15% by mass or less. On the other hand, as the lower limit, it is preferably 3% by mass or more, more preferably 5% by mass or more, and further preferably 8% by mass or more.

The vinyl content (1,2-bonded butadiene content) of SBR is, for example, more than 5% by mass and less than 70% by mass. The vinyl content of SBR refers to the content of 1,2-bonded butadiene with respect to the entire butadiene portion in the SBR component. Further, structural identification of SBR (measurement of styrene content and vinyl content) can be performed using, for example, JNM-ECA series equipment manufactured by JEOL Ltd.

As described above, the content of SBR in 100 parts by mass of the rubber component is preferably 40 parts by mass or more and 80 parts by mass or less, more preferably 50 parts by mass or more and 70 parts by mass or less, and further preferably 55 parts by mass or more and 65 parts by mass or less.

The SBR is not particularly limited, and for example, emulsion-polymerized styrene-butadiene rubber (E-SBR), solution-polymerized styrene-butadiene rubber (S-SBR), and the like can be used. SBR may be either unmodified SBR or modified SBR. In addition, hydrogenated SBR obtained by hydrogenating the butadiene portion of SBR may be used. Hydrogenated SBR may be obtained by subsequently hydrogenating the BR portion of SBR. Styrene, ethylene and butadiene may be copolymerized to give similar structures.

The modified SBR may be any SBR having a functional group that interacts with a filler such as silica. Examples thereof include end-modified SBR (end-modified SBR having the above functional group at the end) in which at least one end of the SBR is modified with a compound having the above functional group (modifying agent), main chain modified SBR having the functional group in the main chain, main chain terminal modified SBR having the functional group at the main chain and the end (for example, a main chain end modified SBR having the above functional group to the main chain and having at least one end modified with the above modifying agent), and end-modified SBR which is modified (coupled) with a polyfunctional compound having two or more epoxy groups in the molecule, and into which an epoxy group or hydroxyl group has been introduced.

Examples of the above functional groups include amino group, amido group, silyl group, alkoxysilyl group, isocyanate group, imino group, imidazole group, urea group, ether group, carbonyl group, oxycarbonyl group, mercapto group, sulfide group, disulfide group, sulfonyl group, sulfinyl group, thiocarbonyl group, ammonium group, imide group, hydrazo group, azo group, diazo group, carboxyl group, nitrile group, pyridyl group, alkoxy group, hydroxyl group, oxy group, and epoxy group. In addition, these functional groups may have a substituent.

As modified SBR, for example, SBR modified with a compound (modifying agent) represented by the following formula can be used.

[Chemical 1]

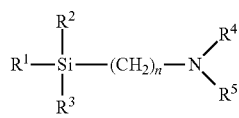

In the formula, $R^1$, $R^2$ and $R^3$ are the same or different and represent alkyl group, alkoxy group, silyloxy group, acetal group, carboxyl group (—COOH), mercapto group (—SH) or derivatives thereof. $R^4$ and $R^5$ are the same or different and represent hydrogen atoms or alkyl group. $R^4$ and $R^5$ may be combined to form a ring structure with nitrogen atoms. n represents an integer.

As the modified SBR modified by the compound (modifying agent) represented by the above formula, in which the polymerization end (active end) of the solution-polymerized styrene-butadiene rubber (S-SBR) is modified with the compound represented by the above formula (for example, modified SBR described in JP-A-2010-111753), can be used.

As $R^1$, $R^2$ and $R^3$, an alkoxy group is suitable (preferably an alkoxy group having 1 to 8 carbon atoms, more preferably an alkoxy group having 1 to 4 carbon atoms). As $R^4$ and $R^5$, an alkyl group (preferably an alkyl group having 1 to 3 carbon atoms) is suitable. n is preferably 1 to 5, more preferably 2 to 4, and further preferably 3. Further, when $R^4$ and $R^5$ are combined to form a ring structure together with a nitrogen atom, a 4- to 8-membered ring is preferable. The alkoxy group also includes a cycloalkoxy group (cyclohexyloxy group, and the like) and an aryloxy group (phenoxy group, benzyloxy group, and the like).

Specific examples of the above modifying agent include 2-dimethylaminoethyltrimethoxysilane, 3-dimethylaminopropyltrimethoxysilane, 2-dimethylaminoethyltriethoxysilane, 3-dimethylaminopropyltriethoxysilane, 2-diethylaminoethyltrimethoxysilane, 3-diethylaminopropyltrimethoxysilane, 2-diethylaminoethyltriethoxysilane, and 3-diethylaminopropyltriethoxysilane. These may be used alone or in combination of two or more.

Further, as modified SBR, modified SBR modified with the following compounds (modifying agents) can also be used. Examples of the modifying agent include polyglycidyl ethers of polyhydric alcohols such as ethylene glycol diglycidyl ether, glycerin triglycidyl ether, trimethylolethanetriglycidyl ether, and trimethylolpropane triglycidyl ether;

polyglycidyl ethers of aromatic compounds having two or more phenol groups such as diglycidylated bisphenol A;

polyepoxy compounds such as 1,4-diglycidylbenzene, 1,3,5-triglycidylbenzene, and polyepoxidized liquid polybutadiene;

epoxy group-containing tertiary amines such as 4,4'-diglycidyl-diphenylmethylamine, and 4,4'-diglycidyl-dibenzylmethylamine;

diglycidylamino compounds such as diglycidylaniline, N,N'-diglycidyl-4-glycidyloxyaniline, diglycidyl orthotoluidine, tetraglycidylmetaxylenidiamine, tetraglycidylaminodiphenylmethane, tetraglycidyl-p-phenylenediamine, diglycidylaminomethylcyclohexane, and tetraglycidyl-1,3-bisaminomethylcyclohexane;

amino group-containing acid chlorides such as bis-(1-methylpropyl) carbamate chloride, 4-morpholincarbonyl chloride, 1-pyrrolidincarbonyl chloride, N,N-dimethylcarbamide acid chloride, and N,N-diethylcarbamide acid chloride;

epoxy group-containing silane compounds such as 1,3-bis-(glycidyloxypropyl)-tetramethyldisiloxane, and (3-glycidyloxypropyl)-pentamethyldisiloxane;

sulfide group-containing silane compound such as (trimethylsilyl) [3-(trimethoxysilyl) propyl] sulfide, (trimethylsilyl) [3-(triethoxysilyl) propyl] sulfide, (trimethylsilyl) [3-(tripropoxysilyl) propyl] sulfide, (trimethylsilyl) [3-(tributoxysilyl) propyl] sulfide, (trimethylsilyl) [3-(methyldimethoxysilyl) propyl] sulfide, (trimethylsilyl) [3-(methyldiethoxysilyl) propyl] sulfide, (trimethylsilyl) [3-(methyldipropoxysilyl) propyl] sulfide, and (trimethylsilyl) [3-(methyldibutoxysilyl) propyl] sulfide;

N-substituted aziridine compound such as ethyleneimine and propyleneimine;

alkoxysilanes such as methyltriethoxysilane, N,N-bis (trimethylsilyl)-3-aminopropyltrimethoxysilane, N,N-bis (trimethylsilyl)-3-aminopropyltriethoxysilane, N,N-bis (trimethylsilyl) aminoethyltrimethoxysilane, and N,N-bis (trimethylsilyl) aminoethyltriethoxysilane;

(thio) benzophenone compound having an amino group and/or a substituted amino group such as 4-N,N-dimethylaminobenzophenone, 4-N,N-di-t-butylaminobenzophenone, 4-N,N-diphenylamino benzophenone, 4,4'-bis (dimethylamino) benzophenone, 4,4'-bis (diethylamino) benzophenone, 4,4'-bis (diphenylamino) benzophenone, and N,N,N',N'-bis-(tetraethylamino) benzophenone;

benzaldehyde compounds having an amino group and/or a substituted amino group such as 4-N,N-dimethylaminobenzaldehyde, 4-N,N-diphenylaminobenzaldehyde, and 4-N,N-divinylamino benzaldehyde;

N-substituted pyrrolidone such as N-methyl-2-pyrrolidone, N-vinyl-2-pyrrolidone, N-phenyl-2-pyrrolidone, N-t-butyl-2-pyrrolidone, and N-methyl-5-methyl-2-pyrrolidone;

N-substituted piperidone such as methyl-2-piperidone, N-vinyl-2-piperidone, and N-phenyl-2-piperidone;

N-substituted lactams such as N-methyl-ε-caprolactam, N-phenyl-ε-caprolactum, N-methyl-ω-laurilolactum, N-vinyl-ω-laurilolactum, N-methyl-β-propiolactam, and N-phenyl-β-propiolactam; and N,N-bis-(2,3-epoxypropoxy)-aniline, 4,4-methylene-bis-(N,N-glycidylaniline), tris-(2,3-epoxypropyl)-1,3,5-triazine-2,4,6-triones, N,N-diethylacetamide, N-methylmaleimide, N,N-diethylurea, 1,3-dimethylethylene urea, 1,3-divinylethyleneurea, 1,3-diethyl-2-imidazolidinone, 1-methyl-3-ethyl-2-imidazolidinone, 4-N,N-dimethylaminoacetophenone, 4-N,N-diethylaminoacetophenone, 1,3-bis (diphenylamino)-2-propanone, and 1,7-bis(methylethylamino)-4-heptanone. The modification with the above compound (modifying agent) can be carried out by a known method.

As the SBR, for example, SBR manufactured and sold by Sumitomo Chemical Co., Ltd., ENEOS Material Co., Ltd., Asahi Kasei Co., Ltd., Nippon Zeon Co., Ltd., etc. can be used. In addition, SBR may be used independently and may be used in combination of 2 or more types.

(a-2) BR

In the present invention, the rubber composition may optionally contain BR as necessary. In this case, the content of BR in 100 parts by mass of the rubber component is preferably more than 20 parts by mass, and more preferably more than 30 parts by mass. On the other hand, it is preferably less than 50 parts by mass, more preferably less than 45 parts by mass.

The weight average molecular weight of BR is, for example, more than 100,000 and less than 2,000,000. The vinyl bond amount of BR is, for example, more than 1% by mass and less than 30% by mass. The cis content of BR is, for example, more than 1% by mass and less than 98% by mass. The trans content of BR is, for example, more than 1% by mass and less than 60% by mass, The BR is not particularly limited, and BR having a high cis content (cis content of 90% or more), BR having a low cis content, BR containing syndiotactic polybutadiene crystals, and the like can be used. The BR may be either a non-modified BR or a modified BR, and examples of the modified BR include a modified BR into which the above-mentioned functional group has been introduced. These may be used alone or in combination of two or more. The cis content can be measured by infrared absorption spectrometry.

As the BR, for example, products of Ube Industries, Ltd., ENEOS Materials Co., Ltd., Asahi Kasei Co., Ltd., and Nippon Zeon Co., Ltd., etc. can be used.

(a-3) Isoprene Rubber

In the present invention, the rubber composition may further contain isoprene rubber as necessary. In this case, the content of the isoprene-based rubber in 100 parts by mass of the rubber component is preferably 20 parts by mass or more and 40 parts by mass or less.

Examples of the isoprene rubber include natural rubber (NR), isoprene rubber (IR), reformed NR, modified NR, and modified IR.

As NR, for example, those commonly used in the tire industry, such as SIR20, RSS #3, and TSR20, can be used. The IR is not particularly limited, and for example, IR 2200 or the like, which is commonly used in the tire industry, can be used. Reformed NR includes deproteinized natural rubber (DPNR), high-purity natural rubber (UPNR), etc., and modified NR includes epoxidized natural rubber (ENR), hydrogenated natural rubber (HNR), grafted natural rubber, etc. Examples of the modified IR include epoxidized isoprene rubber, hydrogenated isoprene rubber, and grafted isoprene rubber. These may be used alone or in combination of two or more.

(a-4) Other Rubber Components

Further, as other rubber components, rubbers (polymers) generally used for manufacturing tires, such as nitrile rubber (NBR), may be contained.

(b) Compounding Materials Other than Rubber Components (b-1) Filler

In the present invention, the rubber composition preferably contains a filler. Examples of specific fillers include silica, carbon black, graphite, calcium carbonate, talc, alumina, clay, aluminum hydroxide, and mica. As described above, among these, it is preferable to use silica and carbon black in combination. Furthermore, (silica content/carbon black content) may be less than one.

(i-1) Silica

In the present invention, the rubber composition preferably contains silica, and preferably contains a silane coupling agent together with silica.

The BET specific surface area of silica is preferably more than 140 m$^2$/g, and more preferably more than 160 m$^2$/g from the viewpoint of obtaining good durability performance. On the other hand, it is preferably less than 300 m$^2$/g from the viewpoint of obtaining good rolling resistance during high-speed running. The BET specific surface area mentioned above is the value of $N_2SA$ measured by the BET method according to ASTM D3037-93.

In the present invention, as described above, it is preferable to use silica having a particle size of 17 nm or less in the rubber composition. By using silica having a small particle size, the frequency of contact with the polymer can be increased. Although the lower limit is not particularly limited, it is preferably 10 nm or more from the viewpoint of dispersibility during mixing.

When silica is used, the content of silica is preferably 30 parts by mass or more, more preferably 40 parts by mass or more, and further preferably 50 parts by mass or more with respect to 100 parts by mass of the rubber component. On the other hand, it is preferably 150 parts by mass or less, more preferably 100 parts by mass or less, and further preferably 60 parts by mass or less.

Examples of silica include dry silica (anhydrous silica) and wet silica (hydrous silica). Among them, wet-process silica is preferable because it has large number of silanol groups. Silica made from water-containing glass or the like, or silica made from biomass materials such as rice husks may also be used.

As the silica, products of Evonik Industries, Rhodia Co., Ltd., Tosoh Silica Co., Ltd., Solvay Japan. Co., Ltd., and Tokuyama Co., Ltd., etc. can be used.

(i-2) Silane Coupling Agent

When silica is used, the rubber composition preferably contains a silane coupling agent together with silica. The silane coupling agent is not particularly limited, and examples thereof include sulfide-based ones such as bis(3-triethoxysilylpropyl)tetrasulfide, bis(2-triethoxysilylethyl)tetrasulfide, bis(4-triethoxysilylbutyl)tetrasulfide, bis (3-trimethoxysilylpropyl) tetrasulfide, bis (2-trimethoxysilylethyl) tetrasulfide, bis (2-triethoxysilylethyl) trisulfide, bis (4-trimethoxysilylbutyl) trisulfide, bis (3-triethoxysilylpropyl) disulfide, bis(2-triethoxysilylethyl) disulfide, bis(4-triethoxysilylbutyl) disulfide, bis(3-trimethoxysilylpropyl) disulfide, bis(2-trimethoxysilylethyl)disulfide, bis(4-trimethoxysilylbutyl) disulfide, 3-trimethoxysilylpropyl-N,N-dimethylthiocarbamoyl tetrasulfide, 2-triethoxysilylethyl-N,N-dimethylthiocarbamoyl tetrasulfide, and 3-triethoxysilylpropyl methacrylate monosulfide;

mercapto-based ones such as 3-mercaptopropyltrimethoxysilane, 2-mercaptoethyltriethoxysilane, and NXT and NXT-Z manufactured by Momentive;

vinyl-based ones such as vinyl triethoxysilane, and vinyl trimethoxysilane;

amino-based ones such as 3-aminopropyltriethoxysilane and 3-aminopropyltrimethoxysilane;

glycidoxy-based ones such as γ-glycidoxypropyltriethoxysilane and γ-glycidoxypropyltrimethoxysilane;

nitro-based ones such as 3-nitropropyltrimethoxysilane, and 3-nitropropyltriethoxysilane; and chloro-based ones such as 3-chloropropyltrimethoxysilane and 3-chloropropyltriethoxysilane, and the like. These may be used alone or in combination of two or more.

As the silane coupling agent, for example, products of Evonik Industries, Momentive Co., Ltd., Shin-Etsu Silicone Co., Ltd., Tokyo Chemical Industry Co., Ltd., Azumax Co., Ltd., Toray Dow Corning Co., Ltd., etc. can be used.

The content of the silane coupling agent is, for example, more than 3 parts by mass and less than 25 parts by mass with respect to 100 parts by mass of silica.

(ii) Carbon Black

In the present invention, the rubber composition preferably contains carbon black from the viewpoint of reinforcing properties.

A specific content ratio of carbon black with respect to 100 parts by mass of the rubber component is preferably 30 parts by mass or more, more preferably 40 parts by mass or more, and further preferably 50 parts by mass or more. On the other hand, it is preferably 80 parts by mass or less, more preferably 70 parts by mass or less, and further preferably 60 parts by mass or less.

Carbon black is not particularly limited, and examples thereof include furnace black (furnace carbon black) such as SAF, ISAF, HAF, MAF, FEF, SRF, GPF, APF, FF, CF, SCF and ECF; acetylene black (acetylene carbon black); thermal blacks (thermal carbon blacks) such as FT and MT; and channel blacks (channel carbon blacks) such as EPC, MPC and CC. These may be used individually by 1 type, and may use 2 or more types together.

The CTAB specific surface area (Cetyl Tri-methyl Ammonium Bromide) of carbon black is preferably 130 $m^2/g$ or more, more preferably 160 $m^2/g$ or more, and further preferably 170 $m^2/g$ or more. On the other hand, it is preferably 250 $m^2/g$ or less, and more preferably 200 $m^2/g$ or less. The CTAB specific surface area is a value measured according to ASTM D3765-92.

Specific carbon black is not particularly limited, and examples thereof include N134, N110, N220, N234, N219, N339, N330, N326, N351, N550, and N762. Commercially available products include, for example, products of Asahi Carbon Co., Ltd., Cabot Japan Co., Ltd., Tokai Carbon Co., Ltd., Mitsubishi Chemical Corporation, Lion Corporation, Shin Nikka Carbon Co., Ltd., Columbia Carbon Co., Ltd., etc. These may be used alone or in combination of two or more.

(iii) Other Fillers

The rubber composition may optionally contain fillers such as graphite, calcium carbonate, talc, alumina, clay, aluminum hydroxide, and mica, which are commonly used in the tire industry, in addition to the above-mentioned silica and carbon black, as necessary. These contents are, for example, more than 0.1 parts by mass and less than 200 parts by mass with respect to 100 parts by mass of the rubber component.

(b-2) Plasticizer Component

The rubber composition may contain oil, liquid rubber, and resin as plasticizer components as components for softening rubber. The plasticizer component is a component that can be extracted from the vulcanized rubber with acetone. The total content of the plasticizer component is preferably 25 parts by mass or more, more preferably 30 parts by mass or more, and further preferably 35 parts by mass or more, with respect to 100 parts by mass of the rubber component. On the other hand, it is preferably 55 parts by mass or less, more preferably 50 parts by mass or less, and further preferably 45 parts by mass or less. When the rubber component described above is an oil-extended rubber component, the amount of the oil-extended oil is included in the oil content.

(i) Oil

Examples of the oil include mineral oils (commonly referred to as process oils), vegetable oils, or mixtures thereof. As the mineral oil (process oil), for example, a paraffinic process oil, an aroma-based process oil, a naphthene process oil, or the like can be used. Examples of the vegetable oils and fats include castor oil, cottonseed oil, linseed oil, rapeseed oil, soybean oil, palm oil, coconut oil, peanut oil, rosin, pine oil, pine tar, tall oil, corn oil, rice oil, beni-flower oil, sesame oil, olive oil, sunflower oil, palm kernel oil, camellia oil, jojoba oil, macadamia nut oil, and tung oil. These may be used alone or in combination of two or more. Moreover, from the viewpoint of life cycle assessment, waste oil after being used as a lubricating oil for mixers for rubber mixing, automobile engines, etc., waste cooking oil, and the like may be used as appropriate.

Specific examples of process oil (mineral oil) include products of Idemitsu Kosan Co., Ltd., Sankyo Yuka Kogyo Co., Ltd., ENEOS Corporation, Olisoy Co., Ltd., H&R Co., Ltd., Toyokuni Seiyu Co., Ltd., Showa Shell Sekiyu Co., Ltd., and Fuji Kosan Co., Ltd.

(ii) Liquid Rubber

The liquid rubber mentioned as the plasticizer is a polymer in a liquid state at room temperature (25° C.) and is a rubber component that can be extracted from a vulcanized tire by acetone extraction. Examples of the liquid rubber include farnesene-based polymers, liquid diene-based polymers, and hydrogenated products thereof.

The farnesene-based polymer is a polymer obtained by polymerizing farnesene, and has a structural unit based on farnesene. Farnesene includes isomers such as α-farnesene ((3E, 7E)-3,7,11-trimethyl-1,3,6,10-dodecatetraene) and β-farnesene (7,11-dimethyl-3-methylene-1,6,10-dodecatorien).

The farnesene-based polymer may be a homopolymer of farnesene (farnesene homopolymer) or a copolymer of farnesene and a vinyl monomer (farnesene-vinyl monomer copolymer).

Examples of the liquid diene-based polymer include a liquid styrene-butadiene copolymer (liquid SBR), a liquid butadiene polymer (liquid BR), a liquid isoprene polymer (liquid IR), and a liquid styrene isoprene copolymer (liquid SIR).

The liquid diene polymer has a polystyrene-converted weight average molecular weight (Mw) measured by gel permeation chromatography (GPC) of, for example, more than $1.0 \times 10^3$ and less than $2.0 \times 10^5$. In the present specification, Mw of the liquid diene-based polymer is a polystyrene conversion value measured by gel permeation chromatography (GPC).

The content of the liquid rubber (the total content of the liquid farnesene-based polymer, the liquid diene-based polymer, etc.) is, for example, more than 1 part by mass and less than 100 parts by mass with respect to 100 parts by mass of the rubber component.

As the liquid rubber, for example, products of Kuraray Co., Ltd., Clay Valley Co., Ltd., etc. can be used.

(iii) Resin Component

The resin component also functions as a tackifying component and may be solid or liquid at room temperature. Examples of the specific resin components include resins such as rosin-based resin, styrene-based resin, coumarone-based resin, terpene-based resin, C5 resin, C9 resin, C5C9 resin, and acrylic resins. Two or more of them may be used in combination. Content of the resin component is more than 2 parts by mass, preferably less than 45 parts by mass, and more preferably less than 30 parts by mass with respect to 100 parts by mass of the rubber component. These resin components may optionally be provided with modified groups capable of reacting with silica or the like.

The rosin-based resin is a resin whose main component is rosin acid obtained by processing rosin. The rosin-based resins (rosins) can be classified according to the presence or absence of modification, and can be classified into unmodified rosin (non-modified rosin) and modified rosin (rosin derivative). Unmodified rosins include tall rosins (also known as tall oil rosins), gum rosins, wood rosins, disproportionated rosins, polymerized rosins, hydrogenated rosins, and other chemically modified rosins. The modified rosin is a modified compound of an unmodified rosin, and examples thereof include rosin esters, unsaturated carboxylic acid-modified rosins, unsaturated carboxylic acid-modified rosin esters, rosin amide compounds, and rosin amine salts.

The styrene-based resin is a polymer using a styrene-based monomer as a constituent monomer, and examples thereof include a polymer obtained by polymerizing a styrene-based monomer as a main component (50% by mass or more). Specifically, it includes homopolymers obtained by individually polymerizing styrene-based monomers (styrene, o-methylstyrene, m-methylstyrene, p-methylstyrene, α-methylstyrene, p-methoxystyrene, p-tert-butylstyrene, p-phenylstyrene, o-chlorostyrene, m-chlorostyrene, p-chlorostyrene, etc.), copolymers obtained by copolymerizing two or more styrene-based monomers, and, in addition, copolymers obtained by copolymerizing a styrene-based monomer and another monomer copolymerizable therewith.

Examples of the other monomers include acrylonitriles such as acrylonitrile and methacrylonitrile; unsaturated carboxylic acids such as acrylic acid and methacrylic acid; unsaturated carboxylic acid esters such as methyl acrylate and methylmethacrylate; dienes such as chloroprene, butadiene, and isoprene, olefins such as 1-butene and 1-pentene; and α, β-unsaturated carboxylic acids such as maleic anhydride and acid anhydrides thereof.

Among coumarone-based resins, coumarone-indene resin is preferred. A coumarone-indene resin is a resin containing coumarone and indene as monomer components constituting the skeleton (main chain) of the resin. Examples of the monomer component contained in the skeleton other than coumarone and indene include styrene, α-methylstyrene, methylindene, and vinyltoluene.

Content of the coumarone-indene resin is, for example, more than 1.0 parts by mass and less than 50.0 parts by mass with respect to 100 parts by mass of the rubber component.

The hydroxyl value (OH value) of the coumarone-indene resin is, for example, more than 15 mgKOH/g and less than 150 mgKOH/g. The OH value is the amount of potassium hydroxide required to neutralize acetic acid bonded to a hydroxyl group when 1 g of the resin is acetylated, and is expressed in milligrams. It is a value measured by potentiometric titration method (JIS K 0070: 1992).

The softening point of the coumarone-indene resin is, for example, higher than 30° C. and lower than 160° C. The softening point is the temperature at which the ball drops when the softening point defined in JIS K 6220-1: 2001 is measured by a ring-ball type softening point measuring device.

Examples of the terpene-based resins include polyterpenes, terpene phenols, and aromatic-modified terpene resins. Polyterpene is a resin obtained by polymerizing a terpene compound or a hydrogenated product thereof. The terpene compound is a hydrocarbon represented by the composition of $(C_5H_8)n$ or an oxygen-containing derivative thereof, which is a compound having a terpene classified as monoterpenes $(C_{10}H_{16})$, sesquiterpenes $(C_{15}H_{24})$, diterpenes $(C_{20}H_{32})$, etc. as the basic skeleton. Examples thereof include α-pinene, β-pinene, dipentene, limonene, myrcene, alloocimene, osimene, α-phellandrene, α-terpinene, γ-terpinene, terpinolene, 1,8-cineol, 1,4-cineol, α-terpineol, β-terpineol, and γ-terpineol.

Examples of the polyterpene include terpene resins such as α-pinene resin, β-pinene resin, limonene resin, dipentene resin, and β-pinene/limonene resin, which are made from the above-mentioned terpene compound, as well as hydrogenated terpene resin obtained by hydrogenating the terpene resin. Examples of the terpene phenol include a resin obtained by copolymerizing the above-mentioned terpene compound and the phenol compound, and a resin obtained by hydrogenating above-mentioned resin. Specifically, a resin obtained by condensing the above-mentioned terpene compound, the phenol compound and formalin can be mentioned. Examples of the phenol compound include phenol, bisphenol A, cresol, and xylenol. Examples of the aromatic-modified terpene resin include a resin obtained by modifying a terpene resin with an aromatic compound, and a resin obtained by hydrogenating the resin. The aromatic compound is not particularly limited as long as it is a compound having an aromatic ring, and examples thereof include phenol compounds such as phenol, alkylphenol, alkoxyphenol, and unsaturated hydrocarbon group-containing phenol; naphthol compounds such as naphthol, alkylnaphthol, alkoxynaphthol, and unsaturated hydrocarbon group-containing naphthols; styrene derivatives such as styrene, alkylstyrene, alkoxystyrene, unsaturated hydrocarbon group-containing styrene; coumarone; and indene.

The "C5 resin" refers to a resin obtained by polymerizing a C5 fraction. Examples of the C5 fraction include petroleum fractions having 4 to 5 carbon atoms such as cyclopentadiene, pentene, pentadiene, and isoprene. As the C5 based petroleum resin, a dicyclopentadiene resin (DCPD resin) is preferably used.

The "C9 resin" refers to a resin obtained by polymerizing a C9 fraction, which may be hydrogenated or modified. Examples of the C9 fraction include petroleum fractions having 8 to 10 carbon atoms such as vinyltoluene, alkylstyrene, indene, and methyl indene. As specific examples thereof, for example, a coumaron indene resin, a coumaron resin, an indene resin, and an aromatic vinyl resin are preferably used. As the aromatic vinyl resin, a homopolymer of α-methylstyrene or styrene or a copolymer of α-methylstyrene and styrene is preferable because it is economical, easy to process, and excellent in heat generation. A copolymer of α-methylstyrene and styrene is more preferred. As the aromatic vinyl-based resin, for example, those commercially available from Kraton Co. Ltd., Eastman Chemical Co. Ltd., etc. can be used.

The "C5-C9 resin" refers to a resin obtained by copolymerizing the C5 fraction and the C9 fraction, which may be hydrogenated or modified. Examples of the C5 fraction and the C9 fraction include the above-mentioned petroleum fraction. As the C5-C9 resin, for example, those commercially available from Tosoh Corporation, LUHUA Co. Ltd., etc. can be used.

Although the acrylic resin is not particularly limited, for example, a non-solvent type acrylic resin can be used.

As the solvent-free acrylic resin, a (meth) acrylic resin (polymer), synthesized by a high-temperature continuous polymerization method (high-temperature continuous lump polymerization method) (a method described in U.S. Pat. No. 4,414,370 B, JP 84-6207 A, JP 93-58805 B, JP 89-313522 A, U.S. Pat. No. 5,010,166 B, Toa Synthetic Research Annual Report TREND2000 No. 3 pages 42-45, and the like) without using polymerization initiators, chain transfer agents, organic solvents, etc. as auxiliary raw materials as much as possible, can be mentioned. In the present invention, (meth) acrylic means methacrylic and acrylic.

Examples of the monomer component constituting the acrylic resin include (meth) acrylic acid, and (meth) acrylic acid derivatives such as (meth) acrylic acid ester (alkyl ester, aryl ester, aralkyl ester, and the like), (meth) acrylamide, and (meth) acrylamide derivative.

In addition to (meth)acrylic acid and (meth)acrylic acid derivatives, styrene, α-methylstyrene, vinyltoluene, vinylnaphthalene, divinylbenzene, trivinylbenzene, divinylnaphthalene, and the like, may be used as monomer components constituting the acrylic resin.

The acrylic resin may be a resin composed only of a (meth)acrylic component, or a resin containing components other than the (meth)acrylic component as constituent elements. Moreover, the acrylic resin may have a hydroxyl group, a carboxyl group, a silanol group, or the like.

As the resin component, for example, a product of Maruzen Petrochemical Co., Ltd., Sumitomo Bakelite Co., Ltd., Yasuhara Chemical Co., Ltd., Toso Co., Ltd., Rutgers Chemicals Co., Ltd., BASF Co., Ltd., Arizona Chemical Co., Ltd., Nitto Chemical Co., Ltd., Co., Ltd., Nippon Catalyst Co., Ltd., ENEOS Co., Ltd., Arakawa Chemical Industry Co., Ltd., Taoka Chemical Industry Co., Ltd. can be used.

(b-3) Stearic Acid

In the present invention, the rubber composition preferably contains stearic acid. Content of stearic acid is, for example, more than 0.5 parts by mass and less than 10.0 parts by mass with respect to 100 parts by mass of the rubber component. As the stearic acid, conventionally known ones can be used, and, for example, products of NOF Corporation, Kao Corporation, Fuji film Wako Pure Chemical Industries, Ltd., and Chiba Fatty Acid Co., Ltd., etc. can be used.

(b-4) Anti-Aging Agent

In the present invention, the rubber composition preferably contains an antioxidant. The content of the anti-aging agent is, for example, more than 0.5 parts by mass and less than 10 parts by mass, and more preferably 1 part by mass or more with respect to 100 parts by mass of the rubber component.

Examples of the antiaging agent include naphthylamine-based antiaging agents such as phenyl-α-naphthylamine; diphenylamine-based antiaging agents such as octylated diphenylamine and 4,4'-bis (α,α'-dimethylbenzyl) diphenylamine; p-phenylenediamine-based anti-aging agent such as N-isopropyl-N'-phenyl-p-phenylenediamine, N-(1,3-dimethylbutyl)-N'-phenyl-p-phenylenediamine, and N,N'-di-2-naphthyl-p-phenylenediamine; quinoline-based anti-aging agent such as a polymer of 2,2,4-trimethyl-1,2-dihydroquinolin; monophenolic anti-aging agents such as 2,6-di-t-butyl-4-methylphenol, styrenated phenol; bis, tris, polyphenolic anti-aging agents such as tetrakis-[methylene-3-(3',5'-di-t-butyl-4'-hydroxyphenyl)propionate] methane. These may be used alone or in combination of two or more.

As the anti-aging agent, for example, products of Seiko Chemical Co., Ltd., Sumitomo Chemical Co., Ltd., Ouchi Shinko Chemical Industry Co., Ltd., Flexsys Co., Ltd., etc. can be used.

(b-5) Wax

In the present invention, the rubber composition preferably contains wax. Content of the wax is, for example, 0.5 to 20 parts by mass, preferably 1.0 to 15 parts by mass, and more preferably 1.5 to 10 parts by mass with respect to 100 parts by mass of the rubber component.

The wax is not particularly limited, and examples thereof include petroleum waxes such as paraffin wax and microcrystalline wax; natural waxes such as plant waxes and animal waxes; synthetic waxes such as polymers of ethylene, propylene, and the like. These may be used alone or in combination of two or more.

As the wax, for example, products of Ouchi Shinko Chemical Industry Co., Ltd., Nippon Seiro Co., Ltd., Seiko Chemical Co., Ltd., etc. can be used.

(b-6) Zinc Oxide

The rubber composition may contain zinc oxide. Content of the zinc oxide is, for example, more than 0.5 parts by mass and less than 10 parts by mass with respect to 100 parts by mass of the rubber component. As the zinc oxide, conventionally known ones can be used, and for example, products of Mitsui Mining & Smelting Co., Ltd., Toho Zinc Co., Ltd., Hakusui Tech. Co., Ltd., Shodo Chemical Industry Co., Ltd., Sakai Chemical Industry Co., Ltd., etc. can be used.

(b-7) Processing Aid

The rubber composition may also contain processing aids. As the processing aids, for example, fatty acid metal salts, fatty acid amides, amide esters, silica surfactants, fatty acid esters, mixtures of fatty acid metal salts and amide esters, mixtures of fatty acid metal salts and fatty acid amides, and the like can be used. For example, products of Rhein Chemie Co., Ltd., Structol Co., Ltd., etc. can be used. These may be used alone or in combination of two or more. Among them, fatty acid metal salts are preferred.

Fatty acids constituting fatty acid metal salts include saturated or unsaturated fatty acids (preferably saturated or unsaturated fatty acids having 6 to 28 carbon atoms (more preferably 10 to 25 carbon atoms, further preferably 14 to 20 carbon atoms)). Examples thereof include lauric acid, myristic acid, palmitic acid, stearic acid, oleic acid, linoleic acid, linolenic acid, arachidic acid, behenic acid, and nervonic acid. These can be used singly or in combination of two or more. Among them, saturated fatty acids are preferred, and saturated fatty acids having 14 to 20 carbon atoms are more preferred.

Examples of metals constituting the fatty acid metal salt include alkali metals such as potassium and sodium, alkaline earth metals such as magnesium, calcium and barium, zinc, nickel and molybdenum. These may be used alone or in combination of two or more. Among them, zinc is preferred.

Content of the processing aid is preferably 0.5 parts by mass or more, more preferably 1.5 parts by mass or more, and further preferably 2 parts by mass or more with respect to 100 parts by mass of the rubber component. On the other hand, it is preferably 8 parts by mass or less, more preferably 6 parts by mass or less, and further preferably 4 parts by mass or less.

(b-8) Cross-Linking Agent and Vulcanization Accelerator

The rubber composition preferably contains a cross-linking agent such as sulfur. Content of the cross-linking agent is, for example, more than 0.1 parts by mass and less than 10.0 parts by mass with respect to 100 parts by mass of the rubber component.

Examples of sulfur include powdered sulfur, precipitated sulfur, colloidal sulfur, insoluble sulfur, highly dispersible sulfur, and soluble sulfur, which are commonly used in the rubber industry. These may be used alone or in combination of two or more.

As the sulfur, for example, products of Tsurumi Chemical Industry Co., Ltd., Karuizawa Sulfur Co., Ltd., Shikoku Chemicals Corporation, Flexsys Co., Ltd., Nippon Kanryu Kogyo Co., Ltd., Hosoi Chemical Industry Co., Ltd., etc. can be used.

Examples of the cross-linking agent other than sulfur include vulcanizing agents containing a sulfur atom such as Tackirol V200 manufactured by Taoka Chemical Industry Co., Ltd., and KA9188 (1,6-bis (N,N'-dibenzylthiocarbamoyldithio) hexane) manufactured by Lanxess Co., Ltd.; and organic peroxides such as dicumyl peroxide.

The rubber composition preferably contains a vulcanization accelerator. Content of the vulcanization accelerator is, for example, more than 0.3 parts by mass and less than 10.0 parts by mass with respect to 100 parts by mass of the rubber component.

Examples of the vulcanization accelerator include
thiazole-based vulcanization accelerators such as 2-mercaptobenzothiazole, di-2-benzothiazolyl disulfide, and N-cyclohexyl-2-benzothiadylsulfenamide;
thiuram-based vulcanization accelerators such as tetramethylthiuram disulfide (TMTD), tetrabenzyltiuram disulfide (TBzTD), and tetrakis (2-ethylhexyl) thiuram disulfide (TOT-N);
sulfenamide-based vulcanization accelerators such as N-cyclohexyl-2-benzothiazolesulfenamide, N-t-butyl-2-benzothiazolyl sulfenamide, N-oxyethylene-2-benzothiazolesulfenamide, and N,N'-diisopropyl-2-benzothiazolesulfenamide; and
guanidine-based vulcanization accelerators such as diphenylguanidine, di-ortho-tolylguanidine and ortho-tolylbiguanidine. These may be used alone or in combination of two or more.

(b-9) Others

In addition to the above components, the rubber composition may contain additives commonly used in the tire industry, such as fatty acid metal salts, carboxylic acid metal salts, organic peroxides, anti-reversion agents may be further contained, if necessary. Content of these additives is, for example, more than 0.1 parts by mass and less than 200 parts by mass with respect to 100 parts by mass of the rubber component.

(2) Production of Rubber Composition

The rubber composition forming the cap rubber layer is prepared by appropriately adjusting the various compounding materials described above and performing a general method, for example, a manufacturing method having a base kneading step of kneading a rubber component and a filler such as carbon black, and a finish kneading step of kneading the kneaded product obtained in the base kneading step and a cross-linking agent.

Kneading can be performed using a known (closed) kneader such as a Banbury mixer, kneader, open roll, or the like.

The kneading temperature in the base kneading step is, for example, higher than 50° C. and lower than 200° C., and the kneading time is, for example, more than 30 seconds and less than 30 minutes. In the base kneading step, in addition to the above components, compounding agents conventionally used in the rubber industry, such as softeners such as oils, zinc oxide, anti-aging agents, waxes, and vulcanization accelerators, may be appropriately added and kneaded as desired.

In the finish kneading step, the kneaded material obtained in the base kneading step and a cross-linking agent are kneaded. The kneading temperature in the finish kneading step is, for example, higher than room temperature and lower than 80° C., and the kneading time is, for example, more than 1 minute and less than 15 minutes. In the finish kneading step, in addition to the above components, a vulcanization accelerator, zinc oxide, and the like may be appropriately added and kneaded as desired.

2. Manufacture of Tires

The tire according to the present invention can be produced as an unvulcanized tire by forming a tread rubber having a predetermined shape using the rubber composition obtained above as a cap rubber layer, and then forming the tire together with other tire members by an ordinary method on a tire molding machine.

When the tread portion is to have a multi-layered structure with the base rubber layer, a rubber composition forming a base rubber layer can be obtained, basically, by using the above-described rubber component and compounding materials, appropriately changing the compounding amounts, and kneading in the same manner. Then, it is extruded together with the cap rubber layer and molded into a tread rubber of a predetermined shape, and then molded together with other tire members on a tire molding machine by a normal method to produce an unvulcanized tire.

Specifically, on the molding drum, the inner liner as a member to ensure the airtightness of the tire, the carcass as a member to withstand the load, impact, and filling air pressure received by the tire, a belt member as a member to strongly tighten the carcass to increase the rigidity of the tread, and the like are wound, both ends of the carcass are fixed to both side edges, a bead portion as a member for fixing the tire to the rim is arranged, and formed into a toroid shape. Then the tread is pasted on the center of the outer circumference, and the sidewall is pasted on the radially outer side to form the side portion. Thus, an unvulcanized tire is produced.

Thereafter, a tire is obtained by heating and pressurizing the produced unvulcanized tire in a vulcanizer. The vulcanization step can be carried out by applying known vulcanization means. The vulcanization temperature is, for example, higher than 120° C. and lower than 200° C., and the vulcanization time is, for example, more than 5 minutes and less than 15 minutes.

As described above, the resulting tire can obtain propulsion by compressing sand and soil on the off-road road surface, taking it into the grooves of the tread portion, and then discharging it from the grooves by rotating the tire. As a result, the off-road performance can be sufficiently improved.

The tire according to the present invention is not particularly limited in category. It can be used as a tire for passenger cars, a tire for heavy-duty vehicles such as trucks and buses, a tire for two-wheeled vehicles, a run-flat tire, a non-pneumatic tire, and the like. It is preferable to use the tire for a passenger car. Moreover, it is preferable to use it as a pneumatic tire.

EXAMPLE

Examples considered to be preferable when implementing the present invention are shown below, but the scope of the present invention is not limited to these examples. In the examples, a pneumatic tire made from a composition obtained by using various chemicals mentioned below and changing the formulation according to each Table was evaluated. The results calculated based on the following evaluation methods are shown in Tables 2 to 5.

1. Rubber Composition Forming Cap Rubber Layer (1) Compounding Material (a) Rubber Component
(a-1) SBR-1: Modified S-SBR obtained by the method shown in the next paragraph (Styrene content: 25% by mass, vinyl content: 25% by mass)
(a-2) SBR-2: (S-SBR) manufactured by ENEOS Material Co., Ltd. (Styrene content: 10% by mass, vinyl content: 42% by mass)
(a-3) SBR-3: HS2565 manufactured by ENEOS Material Co., Ltd. (Styrene content: 20% by mass)
(a-4) SBR-4: T3830 manufactured by Asahi Kasei Corporation (Styrene content: 36% by mass)
(a-5) NR: TSR20
(a-6) BR: Ubepol BR150B (Hi-cis BR) manufactured by Ube Industries, Ltd. (cis content 97% by mass, trans content 2% by mass, vinyl content 1% by mass)
(Manufacture of SBR-1)

The above SBR-1 is produced according to the following procedure. First, two autoclaves having an internal volume of 10 L, having an inlet at the bottom and an outlet at the top, equipped with a stirrer and a jacket, are connected in series as reactors. Butadiene, styrene, and cyclohexane are each mixed in a predetermined ratio. This mixed solution is passed through a dehydration column filled with activated alumina, mixed with n-butyllithium in a static mixer to remove impurities. Then, it is continuously supplied from the bottom of the first reactor, further 2,2-bis(2-oxolanyl) propane as a polar substance and n-butyllithium as a polymerization initiator are continuously supplied at a predetermined rate from the bottom of the first reactor, and the internal temperature of the reactor is kept at 95° C. The polymer solution is continuously withdrawn from the top of the first reactor and supplied to the second reactor. The temperature of the second reactor is kept at 95° C., and a mixture of tetraglycidyl-1,3-bisaminomethylcyclohexane (monomer) as a modifier and an oligomer component is continuously added as a 1000-fold dilution of cyclohexane at a predetermined rate to carry out the denaturation reaction. This polymer solution is continuously withdrawn from the reactor, an antioxidant is added continuously by a static mixer, and the solvent is removed to obtain the desired oil-extended modified diene polymer (SBR-1).

The vinyl content (unit: % by mole) of the SBR-1 is determined by infrared spectroscopy from the absorption intensity near 910 $cm^{-1}$, which is the absorption peak of the vinyl group. Also, the styrene content (unit: % by mass) is determined from the refractive index according to JIS K6383:1995.

(b) Compounding Materials Other than Rubber Components
(b-1) Carbon black: Show Black N134 manufactured by Cabot Japan Co., Ltd. (CTAB specific surface area: 135 $m^2/g$)
(b-2) Silica: Ultrasil VN3 manufactured by Evonik Industries ($N_2$SA: 175 $m^2/g$, 18 nm)
(b-3) Silane coupling agent: Si266 manufactured by Evonik Industries (Bis (3-triethoxysilylpropyl) disulfide)
(b-4) Resin: Petrotac 90 (C5/C9 copolymer petroleum resin) manufactured by Tosoh Corporation
(b-5) Oil: Diana Process AH-24 (aroma oil) manufactured by Idemitsu Kosan Co., Ltd.
(b-6) Wax: Sannok N manufactured by Ouchi Shinko Chemical Industry Co., Ltd.
(b-7) Anti-aging agent-1: Antigen 6C manufactured by Sumitomo Chemical Co., Ltd. (N-(1,3-dimethylbutyl)-N'-phenyl-p-phenylenediamine)
(b-8) Anti-aging agent-2: Antigen RD manufactured by Sumitomo Chemical Co., Ltd. (Polymer of 2,2,4-trimethyl-1,2-dihydroquinoline)
(b-9) Stearic acid: bead stearic acid "Tsubaki" manufactured by NOF Corporation
(b-10) Zinc oxide: Two types of zinc oxide manufactured by Mitsui Mining & Smelting Co., Ltd.
(b-11) Sulfur: powdered sulfur (containing 5% oil) manufactured by Tsurumi Chemical Industry Co., Ltd.
(b-12) Vulcanization accelerator: Nocceler CZ manufactured by Ouchi Shinko Chemical Industry Co., Ltd. (N-cyclohexyl-2-benzothiazylsulfenamide (CBS))

(2) Rubber Composition Forming Cap Rubber Layer

Using a Banbury mixer, materials other than sulfur and a vulcanization accelerator are kneaded at 150° C. for 5 minutes according to the formulations shown in Tables 2 to 5 to obtain a kneaded product. Note that, each compounding amount is part by mass.

Next, sulfur and a vulcanization accelerator are added to the kneaded product, and kneaded at 80° C. for 5 minutes using an open roll to obtain a rubber composition forming a cap rubber layer.

2. Rubber Composition Forming Base Rubber Layer

In parallel, a rubber composition for forming the base rubber layer obtained in the same manner as the rubber composition for forming the cap rubber layer based on the formulation shown in Table 1.

TABLE 1

| Compounding material | Compounding amount (parts by mass) |
|---|---|
| NR(TSR20) | 70 |
| BR (UBEPOL-BR150B manufactured by Ube Industries, Ltd.) | 30 |

TABLE 1-continued

| Compounding material | Compounding amount (parts by mass) |
|---|---|
| Carbon black (Show Black N330T manufactured by Cabot Japan Co., Ltd.) | 35 |
| Stearic acid ("Tsubaki" stearic acid manufactured by NOF Corporation) | 2 |
| Zinc oxide (zinc white No. 1 manufactured by Mitsui Mining & Smelting Co., Ltd.) | 4 |
| Wax (Sannok wax manufactured by Ouchi Shinko Chemical Industry Co., Ltd.) | 2 |
| Anti-aging agent (Nocrac 6C manufactured by Ouchi Shinko Chemical Industry Co., Ltd) | 3 |
| Anti-aging agent (Antage RD manufactured by Kawaguchi Chemical Industry Co., Ltd.) | 1 |
| Sulfur (powdered sulfur manufactured by Tsurumi Chemical Industry Co., Ltd.) | 1.7 |
| Vulcanization accelerator (Nocceler CZ-G manufactured by Ouchi Shinko Chemical Industry Co., Ltd.) | 1.2 |

3. Cap Rubber and Pneumatic Tire

Each rubber composition is extruded into a predetermined shape with a total thickness of 20.5 mm so that the ratio of (thickness of cap rubber layer/thickness of base rubber layer) is 90/10, and a tread portion is produced.

After that, it is pasted together with other tire members to form an unvulcanized tire, and press-vulcanized for 10 minutes at 170° C. to produce each pneumatic tire (test tire) of Examples 1 to 10 and Comparative Examples 1 to 6, which are shown in Tables 2 to 5.

4. Calculation of Parameters (1) Tan δ

From the cap rubber layer of the tread portion of each test tire, a rubber test piece for viscoelasticity measurement is prepared by cutting a size of 20 mm in length×4 mm in width×2 mm in thickness so that the tire circumferential direction is the long side. For each rubber test piece, tan δ is measured using Eplexor series manufactured by GABO under the conditions of frequency of 10 Hz, initial strain of 5%, dynamic strain of 1%, and deformation mode: tensile at temperature of 0° C., 10° C., and 30° C. to obtain 0° C. tan δ, 10° C. tan δ and 30° C. tan δ. The 30° C. tan δ of the base rubber layer is 0.07.

(2) Tg

Regarding each measurement sample prepared by cutting out from the cap rubber layer of the tread portion of each test tire with a size of 20 mm in length×4 mm in width×1 mm in thickness, so that the tire circumferential direction was the long side, tan δ is measured using "Eplexor (registered trademark)" manufactured by GABO under the conditions of frequency of 10 Hz, initial strain of 2%, amplitude of ±1%, and a heating rate of 2° C./min, with changing the temperature from −60° C. to 40° C., and Tg (° C.) is obtained by the method described above.

(3) Groove Depth

Each test tire is placed in a standardized state, and the height from the groove bottom to the opening of the circumferential main groove is measured under no load to define the groove depth G(mm).

After that, using the obtained groove depth G (mm), [−0.5×G−35] and [−0.5×G−40] are calculated. At the same time, (SBR content×land ratio) and (filler content×aspect ratio) are calculated.

5. Performance Evaluation (Off-Road Performance)

(1) Evaluation of Soil Discharge Ability

Each test tire is installed on all wheels of a test vehicle (4600 cc displacement, four-wheel drive vehicle), filled with air to the standardized internal pressure, and then runs on a muddy ground (30 cm deep). Each of the 20 drivers sensory-evaluated the soil discharge ability at that time on a scale of 5 (the larger the value, the better). Then, the total points of the evaluations by the 20 drivers are calculated.

Next, with the result in Comparative Example 5 set to 100, the measured result is indexed based on the following formula to evaluate soil discharge ability. A larger value indicates better soil discharge ability.

Soil discharge ability=[(result of test tire)/(result of Comparative Example 5)]×100

(2) Chipping Resistance Performance

Using the same test vehicle as above, after the tire was idled on a gravel road, 20 drivers visually evaluated the number and size of chipped blocks on the tread portion of the tire on a scale of 5 (the larger the value, the better). Then, the total points of the evaluations by the 20 drivers are calculated.

Next, with the result in Comparative Example 5 set to 100, it is indexed based on the following formula to evaluate the chipping resistance performance. A larger value indicates better chipping resistance performance.

Chipping resistance performance=[(result of test tire)/(result of Comparative Example 5)]×100

(3) Evaluation of Overall Off-Road Performance

Next, the evaluation results of the above (1) and (2 are summed up to obtain an evaluation of overall off-road performance. A larger value indicates better overall off-road performance.

TABLE 2

| | EXAMPLE | | | | | | | |
|---|---|---|---|---|---|---|---|---|
| | 1 | 2 | 3 | 4 | 5 | 6 | 7 | 8 |
| Composition of cap rubber (parts by mass) | | | | | | | | |
| SBR-1 | 40 | 60 | 60 | 60 | 60 | 60 | 60 | 60 |
| SBR-2 | — | — | — | — | — | — | — | — |
| NR | 20 | — | — | — | — | — | — | — |

TABLE 2-continued

| | EXAMPLE | | | | | | | |
|---|---|---|---|---|---|---|---|---|
| | 1 | 2 | 3 | 4 | 5 | 6 | 7 | 8 |
| BR | 40 | 40 | 40 | 40 | 40 | 40 | 40 | 40 |
| CB | 40 | 40 | 50 | 45 | 30 | 70 | 40 | 45 |
| Silica | 50 | 50 | 40 | 60 | 90 | 30 | 90 | 60 |
| Coupling agent | 4.0 | 4.0 | 3.2 | 4.8 | 7.2 | 2.4 | 7.2 | 4.8 |
| Resin | 15 | 15 | 15 | 15 | — | — | — | 20 |
| Oil | 10 | 5 | 5 | 17 | 30 | 25 | 35 | 12 |
| Wax | 2 | 2 | 2 | 2 | 2 | 2 | 2 | 2 |
| Antiaging agent-1 | 2 | 2 | 2 | 2 | 2 | 2 | 2 | 2 |
| Anti-aging agent-2 | 1 | 1 | 1 | 1 | 1 | 1 | 1 | 1 |
| Stearic acid | 2 | 2 | 2 | 2 | 2 | 2 | 2 | 2 |
| Zinc oxide | 2 | 2 | 2 | 2 | 2 | 2 | 2 | 2 |
| Sulfur | 1.4 | 1.4 | 1.4 | 1.4 | 1.4 | 1.4 | 1.4 | 1.4 |
| Vulcanization accelerator | 2 | 2.0 | 2.0 | 2.0 | 2.0 | 2.0 | 2.0 | 2.0 |
| Parameter | | | | | | | | |
| Amount of styrene in SBR (% by mass) | 25 | 25 | 25 | 25 | 25 | 25 | 25 | 25 |
| Filler amount (parts by mass) | 90 | 90 | 90 | 105 | 120 | 100 | 130 | 105 |
| Groove depth G(mm) | 14 | 14 | 14 | 14 | 14 | 14 | 14 | 12 |
| $-0.5 \times G - 35$ | −42 | −42 | −42 | −42 | −42 | −42 | −42 | −41 |
| $-0.5 \times G - 40$ | −47 | −47 | −47 | −47 | −47 | −47 | −47 | −46 |
| Tg (° C.) | −43 | −43 | −44 | −44 | −48 | −48 | −48 | −41 |
| 10° C. tan δ | 0.32 | 0.30 | 0.31 | 0.33 | 0.31 | 0.28 | 0.33 | 0.36 |
| 0° C. tan δ | 0.38 | 0.36 | 0.36 | 0.37 | 0.36 | 0.29 | 0.37 | 0.41 |
| 30° C. tan δ | 0.29 | 0.27 | 0.28 | 0.31 | 0.29 | 0.27 | 0.31 | 0.33 |
| Aspect ratio (%) | 70 | 70 | 70 | 70 | 70 | 70 | 70 | 70 |
| Land ratio (%) | 52 | 52 | 52 | 52 | 52 | 52 | 52 | 52 |
| SBR content × Land ratio | 2080 | 3120 | 3120 | 3120 | 3120 | 3120 | 3120 | 3120 |
| Filler content × Aspect ratio | 6300 | 6300 | 6300 | 7350 | 8400 | 7000 | 9100 | 7350 |
| Performance evaluation | | | | | | | | |
| Soil discharge ability | 102 | 111 | 119 | 116 | 125 | 128 | 122 | 125 |
| Chipping resistance performance | 113 | 102 | 112 | 108 | 92 | 107 | 95 | 113 |
| Overall off-road performance | 215 | 213 | 231 | 224 | 217 | 235 | 217 | 238 |

TABLE 3

| | EXAMPLE | | | | | | | |
|---|---|---|---|---|---|---|---|---|
| | 9 | 10 | 11 | 12 | 13 | 14 | 15 | 16 |
| Composition of cap rubber (parts by mass) | | | | | | | | |
| SBR-1 | 60 | 60 | 60 | 60 | 60 | 80 | 60 | 60 |
| SBR-2 | — | — | — | — | — | — | — | 20 |
| NR | — | — | — | — | — | — | — | — |
| BR | 40 | 40 | 40 | 40 | 40 | 20 | 40 | 20 |
| CB | 60 | 50 | 80 | 80 | 80 | 40 | 5 | 40 |
| Silica | 40 | 70 | 40 | 40 | 40 | 50 | 110 | 50 |
| Coupling agent | 3.2 | 5.6 | 3.2 | 3.2 | 3.2 | 4 | 8.8 | 4 |
| Resin | 15 | 8 | — | 8 | 8 | 15 | 15 | 15 |
| Oil | 15 | 32 | 35 | 32 | 32 | 5 | 25 | 5 |
| Wax | 2 | 2 | 2 | 2 | 2 | 2 | 2 | 2 |
| Anti-aging agent-1 | 2 | 2 | 2 | 2 | 2 | 2 | 2 | 2 |
| Anti-aging agent-2 | 1 | 1 | 1 | 1 | 1 | 1 | 1 | 1 |
| Stearic acid | 2 | 2 | 2 | 2 | 2 | 2 | 2 | 2 |
| Zinc oxide | 2 | 2 | 2 | 2 | 2 | 2 | 2 | 2 |
| Sulfur | 1.4 | 1.4 | 1.4 | 1.4 | 1.4 | 1.4 | 1.4 | 1.4 |
| Vulcanization accelerator | 2.0 | 2.0 | 2.0 | 2.0 | 2.0 | 2.0 | 2.0 | 2.0 |
| Parameter | | | | | | | | |
| Amount of styrene in SBR (% by mass) | 25 | 25 | 25 | 25 | 25 | 25 | 25 | 21.3 |
| Filler amount (parts by mass) | 100 | 120 | 120 | 120 | 120 | 90 | 115 | 90 |

TABLE 3-continued

| | EXAMPLE | | | | | | | |
|---|---|---|---|---|---|---|---|---|
| | 9 | 10 | 11 | 12 | 13 | 14 | 15 | 16 |
| Groove depth G (mm) | 14 | 14 | 14 | 16 | 14 | 10 | 14 | 10 |
| −0.5 × G − 35 | −42 | −42 | −42 | −43 | −42 | −40 | −42 | −40 |
| −0.5 × G − 40 | −47 | −47 | −47 | −48 | −47 | −45 | −47 | −40 |
| Tg (° C.) | −43 | −47 | −48 | −47 | −47 | −40 | −42 | −40 |
| 10° C. tan δ | 0.33 | 0.35 | 0.33 | 0.36 | 0.36 | 0.30 | 0.33 | 0.28 |
| 0° C. tan δ | 0.37 | 0.40 | 0.37 | 0.41 | 0.41 | 0.39 | 0.38 | 0.36 |
| 30° C. tan δ | 0.31 | 0.33 | 0.31 | 0.34 | 0.34 | 0.25 | 0.31 | 0.24 |
| Aspect ratio (%) | 70 | 70 | 70 | 70 | 70 | 70 | 70 | 70 |
| Land ratio (%) | 52 | 52 | 52 | 52 | 52 | 52 | 52 | 52 |
| SBR content × Land ratio | 3120 | 3120 | 3120 | 3120 | 3120 | 4160 | 3120 | 3120 |
| Filler content × Aspect ratio | 7000 | 8400 | 8400 | 8400 | 8400 | 6300 | 8050 | 6300 |
| Performance evaluation | | | | | | | | |
| Soil discharge ability | 126 | 130 | 134 | 135 | 140 | 106 | 122 | 105 |
| Chipping resistance performance | 111 | 108 | 117 | 120 | 124 | 105 | 102 | 110 |
| Overall off-road performance | 237 | 238 | 251 | 255 | 264 | 211 | 224 | 215 |

TABLE 4

| | EXAMPLE | | | |
|---|---|---|---|---|
| | 17 | 18 | 19 | 20 |
| Composition of cap rubber (parts by mass) | | | | |
| SBR-1 | — | 70 | 80 | 60 |
| SBR-3 | 60 | — | — | — |
| NR | — | — | — | — |
| BR | 40 | 30 | 20 | 40 |
| CB | 40 | 30 | 40 | 80 |
| Silica | 50 | 30 | 50 | 40 |
| Coupling agent | 4 | 2.4 | 4 | 3.2 |
| Resin | 15 | 30 | 15 | 8 |
| Oil | 5 | — | 5 | 32 |
| Wax | 2 | 2 | 2 | 2 |
| Anti-aging agent-1 | 2 | 2 | 2 | 2 |
| Anti-aging agent-2 | 1 | 1 | 1 | 1 |
| Stearic acid | 2 | 2 | 2 | 2 |
| Zinc oxide | 2 | 2 | 2 | 2 |
| Sulfur | 1.4 | 1.4 | 1.4 | 1.4 |
| Vulcanization accelerator | 2 | 2 | 2 | 2 |
| Parameter | | | | |
| Amount of styrene in SBR (% by mass) | 20 | 25 | 25 | 25 |
| Filler amount (parts by mass) | 90 | 60 | 90 | 120 |
| Groove depth G (mm) | 14 | 10 | 10 | 14 |
| −0.5 × G − 35 | −42 | −40 | −40 | −42 |
| −0.5 × G − 40 | −47 | −47 | −45 | −47 |
| Tg (° C.) | −49 | −40 | −40 | −47 |
| 10° C. tan δ | 0.28 | 0.29 | 0.3 | 0.36 |
| 0° C. tan δ | 0.33 | 0.48 | 0.39 | 0.41 |
| 30° C. tan δ | 0.25 | 0.20 | 0.25 | 0.34 |
| Aspect ratio (%) | 70 | 70 | 70 | 76 |
| Land ratio (%) | 52 | 52 | 56 | 52 |
| SBR content × Land ratio | 3120 | 3640 | 4480 | 3120 |
| Filler content × Aspect ratio | 6300 | 4200 | 6300 | 9120 |
| Performance evaluation | | | | |
| Soil discharge ability | 120 | 111 | 102 | 104 |
| Chipping resistance performance | 104 | 120 | 106 | 118 |
| Overall off-road performance | 224 | 231 | 208 | 222 |

TABLE 5

| | COMPARATIVE EXAMPLE | | | | | |
|---|---|---|---|---|---|---|
| | 1 | 2 | 3 | 4 | 5 | 6 |
| Composition of cap rubber (parts by mass) | | | | | | |
| SBR-1 | 30 | 80 | 60 | 80 | 60 | |
| SBR-4 | — | — | — | — | — | 40 |
| NR | 30 | — | — | — | — | 20 |
| BR | 40 | 20 | 40 | 20 | 40 | 40 |
| CB | 30 | 25 | 40 | 20 | 40 | 40 |
| Silica | 50 | 30 | 50 | 40 | 50 | 50 |
| Coupling agent | 4.0 | 2.4 | 4.0 | 3.2 | 4.0 | 4.0 |
| Resin | 15 | 20 | 10 | 24 | 15 | 15 |
| Oil | 5 | 0 | 17 | 5 | 5 | 5 |
| Wax | 2 | 2 | 2 | 2 | 2 | 2 |
| Anti-aging agent-1 | 2 | 2 | 2 | 2 | 2 | 2 |
| Anti-aging agent-2 | 1 | 1 | 1 | 1 | 1 | 1 |
| Stearic acid | 2 | 2 | 2 | 2 | 2 | 2 |

TABLE 5-continued

|  | COMPARATIVE EXAMPLE | | | | | |
| --- | --- | --- | --- | --- | --- | --- |
|  | 1 | 2 | 3 | 4 | 5 | 6 |
| Zinc oxide | 2 | 2 | 2 | 2 | 2 | 2 |
| Sulfur | 1.4 | 1.4 | 1.4 | 1.4 | 1.4 | 1.4 |
| Vulcanization accelerator | 2.0 | 2.0 | 2.0 | 2.0 | 2.0 | 2.0 |
| Parameter | | | | | | |
| Amount of styrene in SBR (% by mass) | 25 | 25 | 25 | 25 | 25 | 36 |
| Filler amount (parts by mass) | 80 | 55 | 90 | 60 | 90 | 90 |
| Groove depth G (mm) | 10 | 10 | 10 | 5 | 17 | 14 |
| −0.5 × G − 35 | −40 | −40 | −40 | −38 | −44 | −42 |
| −0.5 × G − 40 | −45 | −45 | −45 | −43 | −49 | −47 |
| Tg (° C.) | −44 | −40 | −41 | −38 | −43 | −43 |
| 10° C. tan δ | 0.29 | 0.28 | 0.27 | 0.28 | 0.30 | 0.3 |
| 0° C. tan δ | 0.33 | 0.38 | 0.32 | 0.39 | 0.36 | 0.36 |
| 30° C. tan δ | 0.27 | 0.18 | 0.25 | 0.17 | 0.27 | 0.27 |
| Aspect ratio (%) | 70 | 70 | 70 | 70 | 70 | 70 |
| Land ratio (%) | 52 | 52 | 52 | 52 | 52 | 52 |
| SBR content × Land ratio | 1560 | 4160 | 3120 | 4160 | 3120 | 2080 |
| Filler content × Aspect ratio | 5600 | 3850 | 6300 | 4200 | 6300 | 6300 |
| Performance evaluation | | | | | | |
| Soil discharge ability | 100 | 102 | 99 | 96 | 100 | 85 |
| Chipping resistance performance | 97 | 86 | 92 | 81 | 100 | 98 |
| Overall off-road performance | 197 | 188 | 191 | 177 | 200 | 183 |

Although the present invention has been described above based on the embodiments, the present invention is not limited to the above embodiments. Various modifications can be made to the above embodiment within the same and equivalent scope of the present invention.

The present invention (1) is
a tire with a tread portion having a circumferential groove communicating in the circumferential direction, wherein the cap rubber layer forming the tread portion is formed from a rubber composition which contains
40 parts by mass or more and 80 parts by mass or less of styrene-butadiene rubber (SBR) having a styrene content of 25% by mass or less in 100 parts by mass of the rubber component, and 60 parts by mass or more of a filler with respect to 100 parts by mass of the rubber component, and has a loss tangent 10° C. tan δ measured under the conditions of temperature of 10° C., frequency of 10 Hz, initial strain of 5%, and dynamic strain rate of 1% and in deformation mode; tensile of less than 0.28, and
a glass transition temperature Tg (° C.) of −40° C. or lower; and
the glass transition temperature Tg (° C.) and the depth G (mm) of the circumferential groove satisfy the following (formula 1).

$$Tg \leq -0.5 \times G - 35 \quad \text{(formula 1)}$$

The present invention (2) is
the tire according to the present invention (1), wherein the styrene-butadiene rubber (SBR) has a styrene content of 20% by mass or less.

The present invention (3) is
the tire according to the present invention (1) or (2), wherein the content of the filler is 90 parts by mass or more with respect to 100 parts by mass of the rubber component.

The present invention (4) is
the tire of any combination of the present inventions (1) to (3), wherein the 10° C. tan δ is 0.31 or more.

The present invention (5) is
the tire of any combination of the present inventions (1) to (4), wherein loss tangent 0° C. tan δ of the cap rubber layer measured under the conditions of temperature of 0° C., frequency of 10 Hz, initial strain of 5%, dynamic strain rate of 1%, and in deformation mode: tensile is 0.30 or more.

The present invention (6) is
the tire according to the present invention (5), wherein the 0° C. tan δ is 0.35 or more.

The present invention (7) is
the tire of any combination of the present inventions (1) to (6), wherein the loss tangent 30° C. tan δ of the cap rubber layer measured under the conditions of temperature of 30° C., frequency of 10 Hz, initial strain of 5%, dynamic strain rate of 1%, and in deformation mode: tensile is 0.27 or more.

The present invention (8) is
the tire of any combination of the present inventions (1) to (7), wherein the following (formula 2) is satisfied.

$$Tg \leq -0.5 \times G - 40 \quad \text{(formula 2)}$$

The present invention (9) is
the tire of any combination of the present inventions (1) to (8), wherein the thickness of the cap rubber layer occupies 10% or more of the entire tread portion.

The present invention (10) is
the tire of any combination of the present inventions (1) to (9), wherein the land ratio in the tread portion is 40% or more, and the product of the content (parts by mass) of the styrene-butadiene rubber (SBR) having a styrene content of 25% by mass or less in 100 parts by mass of the rubber component and the land ratio (%) in the tread portion (SBR content×land ratio) is 7200 or less.

The present invention (11) is the tire of any combination of the present inventions (1) to (10), wherein the aspect ratio is 80% or less, and the product of the content (parts by mass) of the filler with respect to 100 parts by mass of the rubber component and the aspect ratio (filler content×aspect ratio) is 9100 or less.

What is claimed is:

1. A tire with a tread portion having a cap rubber layer and a circumferential groove communicating in the circumferential direction, wherein the cap rubber layer forming the tread portion is formed from a rubber composition which
    contains 40 parts by mass or more and 80 parts by mass or less of styrene-butadiene rubber (SBR) having a styrene content of 25% by mass or less in 100 parts by mass of a rubber component of the rubber composition, and 60 parts by mass or more of a filler with respect to 100 parts by mass of the rubber component,
    has a loss tangent 10° C. tan δ of 0.28 or more, measured under the conditions of temperature of 10° C., frequency of 10 Hz, initial strain of 5%, dynamic strain rate of 1% and deformation tensile, and
    has a glass transition temperature Tg (° C.) of −40° C. or lower;
wherein
    the glass transition temperature Tg (° C.) and the depth G (mm) of the circumferential groove satisfy the following (formula 1): Tg≤−0.5×G−35 (formula 1) and
    the acetone extractable content (AE) of the cap rubber layer is 10% by mass or more, and 25% by mass or less.

2. A tire with a tread portion having a cap rubber layer and a circumferential groove communicating in the circumferential direction, wherein the cap rubber layer forming the tread portion is formed from a rubber composition which
    contains 40 parts by mass or more and 80 parts by mass or less of styrene-butadiene rubber (SBR) having a styrene content of 25% by mass or less in 100 parts by mass of a rubber component of the rubber composition, and 105 parts by mass or more of a filler of carbon black and silica with respect to 100 parts by mass of the rubber component, wherein the carbon black content is greater than the silica content,
    has a loss tangent 10° C. tan δ of 0.28 or more, measured under the conditions of temperature of 10° C., frequency of 10 Hz, initial strain of 5%, dynamic strain rate of 1% and deformation tensile, and
    has a glass transition temperature Tg (° C.) of −40° C. or lower;
    wherein the glass transition temperature Tg (° C.) and the depth G (mm) of the circumferential groove satisfy the following (formula 1):

Tg≤−0.5×G−35  (formula 1).

3. A tire with a tread portion having a cap rubber layer and a circumferential groove communicating in the circumferential direction, wherein the cap rubber layer forming the tread portion is formed from a rubber composition which
    contains 40 parts by mass or more and 80 parts by mass or less of styrene-butadiene rubber (SBR) having a styrene content of 25% by mass or less in 100 parts by mass of a rubber component of the rubber composition, and 105 parts by mass or more of a filler of carbon black and silica with respect to 100 parts by mass of the rubber component, wherein the carbon black content is greater than the silica content,
    has a loss tangent 10° C. tan δ of 0.28 or more, measured under the conditions of temperature of 10° C., frequency of 10 Hz, initial strain of 5%, dynamic strain rate of 1% and deformation tensile, and
    has a glass transition temperature Tg (° C.) of −40° C. or lower;
wherein
    the glass transition temperature Tg (° C.) and the depth G (mm) of the circumferential groove satisfy the following (formula 1): Tg≤−0.5×G−35 (formula 1) and
    the acetone extractable content (AE) of the cap rubber layer is 10% by mass or more, and 25% by mass or less.

4. The tire according to claim 3, wherein the styrene-butadiene rubber (SBR) has a styrene content of 20% by mass or less.

5. The tire according to claim 3, wherein the content of the filler is 90 parts by mass or more with respect to 100 parts by mass of the rubber component.

6. The tire according to claim 3, wherein the 10° C. tan δ is 0.31 or more.

7. The tire according to claim 3, wherein the loss tangent 30° C. tan δ of the cap rubber layer measured under the conditions of temperature of 30° C., frequency of 10 Hz, initial strain of 5%, dynamic strain rate of 1%, and in deformation mode: tensile is 0.27 or more.

8. The tire according to claim 3, wherein the following (formula 2) is satisfied, Tg≤−0.5×G−40  (formula 2)

9. The tire according to claim 3, wherein the thickness of the cap rubber layer occupies 10% or more of the entire tread portion.

10. The tire according to claim 3, wherein the land ratio in the tread portion is 40% or more, and the product of the content (parts by mass) of the styrene-butadiene rubber (SBR) having a styrene content of 25% by mass or less in 100 parts by mass of the rubber component and the land ratio (%) in the tread portion (SBR content×land ratio) is 7200 or less.

11. The tire according to claim 3, wherein the aspect ratio is 80% or less, and the product of the content (parts by mass) of the filler with respect to 100 parts by mass of the rubber component and the aspect ratio (filler content×aspect ratio) is 9100 or less.

12. The tire according to claim 3, wherein loss tangent 0° C. tan δ of the cap rubber layer measured under the conditions of temperature of 0° C., frequency of 10 Hz, initial strain of 5%, dynamic strain rate of 1%, and in deformation mode: tensile is 0.30 or more.

13. The tire according to claim 12, wherein the 0° C. tan δ is 0.35 or more.

* * * * *